(12) United States Patent
Sasaki et al.

(10) Patent No.: US 8,107,461 B2
(45) Date of Patent: Jan. 31, 2012

(54) SIP EXCHANGE SYSTEM

(75) Inventors: Takahiro Sasaki, Koriyama (JP);
Kazuhiko Kubo, Koriyama (JP)

(73) Assignee: Hitachi Communication Technologies, Ltd., Tokyo (JP)

(*) Notice: Subject to any disclaimer, the term of this patent is extended or adjusted under 35 U.S.C. 154(b) by 1193 days.

(21) Appl. No.: 11/680,773

(22) Filed: Mar. 1, 2007

(65) Prior Publication Data
US 2007/0274294 A1 Nov. 29, 2007

(30) Foreign Application Priority Data

Mar. 31, 2006 (JP) ................................ 2006-098625

(51) Int. Cl.
*H04L 12/66* (2006.01)
(52) U.S. Cl. ... 370/352; 370/356; 370/353; 370/395.52; 379/211.04
(58) Field of Classification Search .......... 370/352–356; 379/201.4, 211.2, 201.04, 211.02
See application file for complete search history.

(56) References Cited

U.S. PATENT DOCUMENTS

| | | | |
|---|---|---|---|
| 6,366,659 B1 | 4/2002 | Koponen et al. | |
| 6,937,713 B1* | 8/2005 | Kung et al. | 379/211.02 |
| 7,496,190 B1* | 2/2009 | Kung et al. | 379/211.02 |
| 7,542,558 B2* | 6/2009 | Klein et al. | 379/201.01 |
| 7,693,135 B2* | 4/2010 | Pershan | 370/352 |
| 2003/0108161 A1* | 6/2003 | Brown et al. | 379/88.01 |
| 2003/0161448 A1* | 8/2003 | Parolkar et al. | 379/88.17 |
| 2004/0160947 A1* | 8/2004 | Hardy et al. | 370/352 |
| 2005/0190721 A1* | 9/2005 | Pershan | 370/328 |
| 2005/0195954 A1* | 9/2005 | Klein et al. | 379/201.04 |
| 2005/0243809 A1* | 11/2005 | Best et al. | 370/356 |
| 2006/0039359 A1* | 2/2006 | Pang | 370/352 |
| 2006/0274660 A1* | 12/2006 | Da Palma et al. | 370/241 |
| 2007/0047532 A1* | 3/2007 | Bangor et al. | 370/356 |
| 2007/0058637 A1* | 3/2007 | Lo | 370/395.2 |
| 2007/0091800 A1* | 4/2007 | Corcoran | 370/230 |
| 2009/0154681 A1* | 6/2009 | Kung et al. | 379/211.02 |

FOREIGN PATENT DOCUMENTS

| | | |
|---|---|---|
| EP | 1 146 754 A1 | 10/2001 |
| JP | 06-244951 A | 9/1994 |
| JP | 2000-115381 A | 4/2000 |
| JP | 2000-184414 A | 6/2000 |
| JP | 2001-506077 A | 5/2001 |
| JP | 2001-359148 A | 12/2001 |
| JP | 2002-152224 A | 5/2002 |

* cited by examiner

*Primary Examiner* — Joe Cheng
*Assistant Examiner* — Khaled Kassim
(74) *Attorney, Agent, or Firm* — Foley & Lardner LLP

(57) ABSTRACT

The total system, which is operated by SIP (Session Initiation Protocol) call sequence and SIP call replacement sequence, comprises control part which includes sequence part for immediately performing the SIP call replacement sequence upon detecting communication of call forwarding or proxy response, SIP exchange equipment which includes storage part for storing sequence program of the call forwarding and proxy response, SIP telephones 3a to 3n, and a network such as Internet or wide LAN to which the SIP exchange equipment and SIP telephones 3a to 3n are connected, so that it is able to provide the SIP exchange system for agreeing a final party in communication and party number display, even an party responds the incoming call is changed by the call forwarding or proxy response.

8 Claims, 7 Drawing Sheets

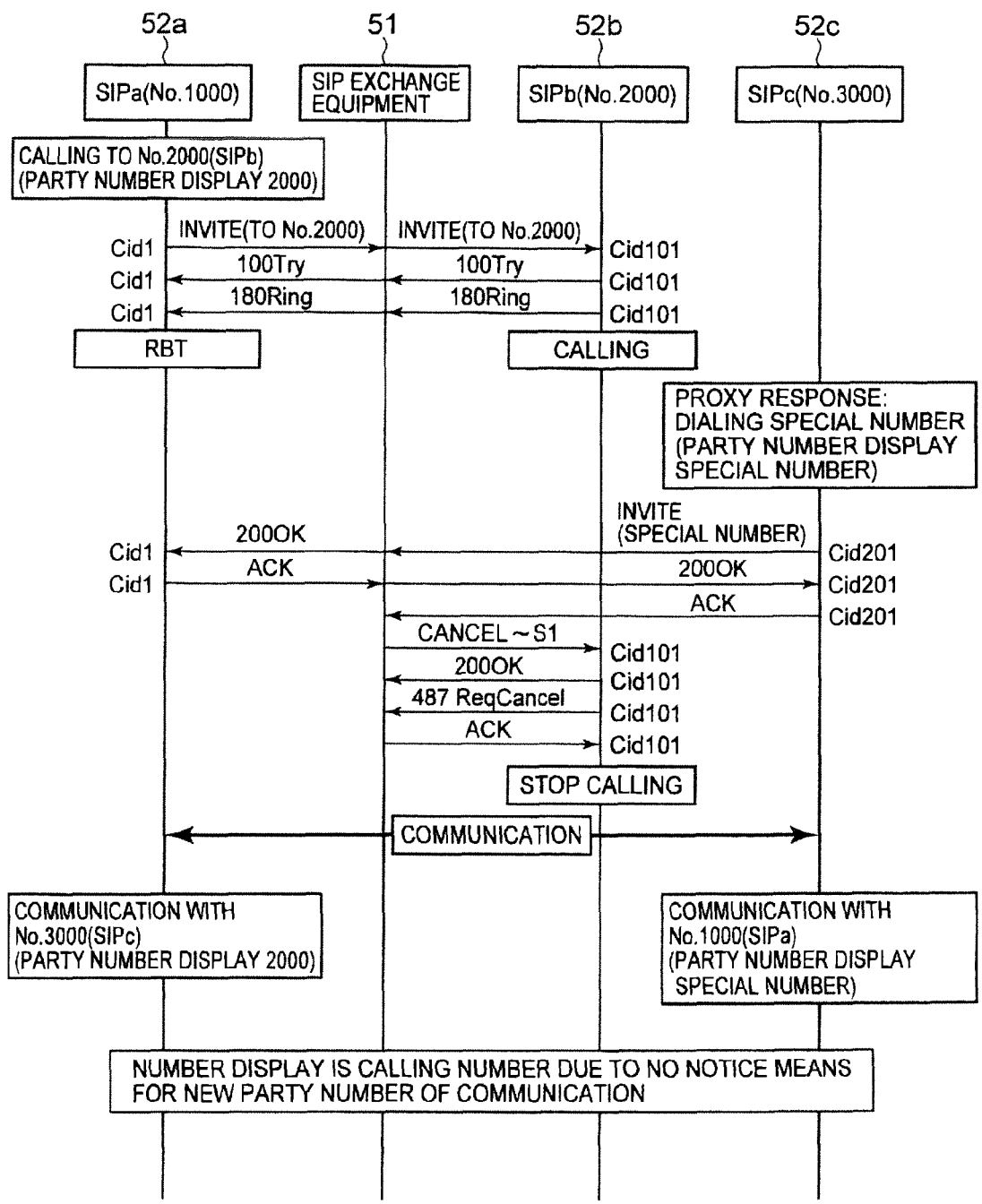

SIP EXCHANGE SYSTEM

CROSS-REFERENCES TO RELATED APPLICATION

This application claims priority benefit under 35 U.S.C. sctn. 119 of Japanese Patent Application No. 2006-98625, filed on Mar. 31, 2006, the entirety of which is incorporated herein by reference.

BACKGROUND OF THE INVENTION

1. Field of the Invention

The present invention relates to a SIP (Session Initiation Protocol) exchange system which performs communication between SIP telephones to each other by using SIP call control and, more specifically, to a SIP exchange system which can display a telephone number of a called party that is communicating on a calling SIP telephone, even an incoming party is changed due to call forwarding or proxy response.

2. Description of the Related Art

A conventional telephone transmission system performs dialing call, incoming call, communication, displaying a telephone number of a called party, and the like between SIP telephones through SIP call control of SIP exchange equipment.

In the communication between SIP telephones, when a calling SIP telephone dials to a called SIP telephone as target (i.e., telephone number of the called SIP telephone); however, if "call forwarding" is preset in the called SIP telephone, the incoming call forwards to a SIP telephone of the call forwarding.

And, when a called SIP telephone is ringing for an incoming tone; however, if the user of the called SIP telephone can not or will not respond to the incoming call, a user of other SIP telephone operates "special number" to set "proxy service" and responds to the incoming call, then the SIP telephone of the proxy response will receive the incoming call.

A conventional SIP exchange system will be described below. FIG. 6 shows a configuration of a conventional SIP exchange system. In FIG. 6, a SIP exchange system 50 comprises, for example, SIP exchange equipment 51 and SIP telephones which comprises a SIP terminal 52a, a SIP terminal 52b, and a SIP terminal 52c. The SIP exchange equipment 51 and the SIP telephones are connected to a network NT.

The SIP exchange equipment 51 performs SIP call control on the SIP terminal 52a, SIP terminal 52b, and SIP terminal 52c. For example, when the SIP terminal 52a (telephone number "1000") dials to a telephone number "2000", the SIP telephone 52b receives the incoming call (i.e., ringing for the incoming tone). When the SIP telephone 52b responds the incoming call, the communication between the SIP terminal 52a and SIP telephone 52b becomes possible.

In this communication, the display of the SIP terminal 52a displays the called party number "2000", and the display of the SIP terminal 52b displays the calling party number "1000", so that the telephone number displayed on the one party corresponds with the other party of communication.

Next, a sequence operation will be described. In this operation, when the SIP terminal 52a dials to the SIP terminal 52b, the SIP terminal 52b is set "call forwarding" for forwarding to the SIP terminal 52c (telephone number "No. 3000"), or the SIP terminal 52c performs "proxy response" for the incoming call directed to the SIP terminal 52b.

FIG. 7 shows a sequence diagram of call forwarding operation of an embodiment of a conventional SIP exchange system. In addition, a SIP terminal 52a, a SIP terminal 52b, and a SIP terminal 52c are represented as SIPa (No. 1000), SIPb (No. 2000), and SIPc (No. 3000) respectively.

In FIG. 7, the SIP exchange equipment 51 has previously been set "call forwarding" for forwarding from the SIPb (No. 2000) to the SIPc (No. 3000).

When the SIPa (No. 1000) dials to the SIPb (No. 2000), the display of the SIPa (No. 1000) displays the called party number "2000". Then the SIPa transmits a calling message "INVITE (to No. 2000)" to the SIP exchange equipment 51, the SIP exchange equipment 51, which should forward the call to the party number "3000", transmits the calling message "INVITE (to No. 3000)" to the SIPc (No. 3000).

Upon receiving the calling message "INVITE (to No. 3000)", the SIPc (No. 3000) transmits a temporary reception response message "100 Try" to the SIP exchange equipment 51. The SIP exchange equipment 51 then transmits the temporary reception response message "100 Try" to the SIPa (No. 1000).

Subsequently, when the SIPc (No. 3000) transmits a coming ringing start message "180 Ring" to the SIPa (No. 1000) via the SIP exchange equipment 51a, the ringing tone (incoming tone) is generated in the SIPc (No. 3000), and the RBT (ring back tone) is generated in the SIPa (No. 1000).

Upon listening the ringing tone (incoming tone), the SIPC (No. 3000) responds the incoming call, and transmits an incoming response message "200 OK" to the SIPa (No. 1000) via the SIP exchange equipment 51.

Upon receiving the incoming response message "200 OK", the SIPa (No. 1000) transmits an acknowledgement message "ACK" to the SIPc (No. 3000) via the SIP exchange equipment 51.

In this state, the SIPa (No. 1000) and the SIPc (No. 3000) move to the communication; the display of the SIPa (No. 1000) displays the party number "2000", and the display of the SIPc (No. 3000) displays the party number "1000".

Therefore, the display of the SIPc (No. 3000) displays the party number "1000" that corresponds with the party of communication; however, the display of the SIPa (No. 1000) displays the party number "2000" (number of the SIP b) that is different from the party of communication (SIPc (No. 3000)).

FIG. 8 shows a sequence diagram of proxy response operation of an embodiment of a conventional SIP exchange system. In addition, a SIP terminal 52a, a SIP terminal 52b, and a SIP terminal 52c are represented as SIPa (No. 1000), SIPb (No. 2000), and SIPC (No. 3000) respectively.

In FIG. 8, when the SIPa (No. 1000) dials to the SIPb (No. 2000), the display of the SIPa (No. 1000) displays the called party number "2000", the ringing tone (incoming tone) is generated in the SIPb (No. 2000), and the RBT (ring-back tone) is generated in the SIPa (No. 1000). In this state, when the SIPc (No. 3000) dials a special number, e.g., "YZ" for "proxy response", and transmits a calling message "INVITE (to the special number)" to the SIP exchange equipment 51, the SIP exchange equipment 51 then transmits an incoming response message "200 OK" to the SIPa (No. 1000).

When the SIPa (No. 1000) transmits an acknowledgement response message "ACK" to the SIP exchange equipment 51, the SIP exchange equipment 51 then transmits a response message "200 OK" to the SIPc (No. 3000).

Next, when the SIPc (No. 3000) transmits an acknowledgement response message "ACK" to the SIP exchange equipment 51, SIPa (No. 1000) and SIPc (No. 3000) initiate the communication.

On the other hand, the SIP exchange equipment 51 transmits an incoming cancel message "CANCEL" to the SIPb (No. 2000), and upon receiving a response message "200

OK" and a message "487 ReqCancel" from the SIPb (No. 2000), transmits an acknowledgement response message "ACK" to the SIPb (No. 2000). The SIPb (No. 2000) then stops the ringing (incoming tone stop).

In this state, the SIPa (No. 1000) and SIPc (No. 3000) move to communication; the display of the SIPa (No. 1000) displays the party number "2000", the display of the SIPc (No. 3000) displays the "special number".

Therefore, the display of the SIPc (No. 3000) displays the party number "special number YZ" different from the party of communication (SIPa (No. 1000)), and the display of the SIPa (No. 1000) displays the party number "2000" different from the party of communication (SIPc (No. 3000)).

And, the conventional SIP exchange system is known, as disclosed in Japanese Laid-Open Patent Application No. 2002-152224; hereinafter "patent document 1", which is configured to provide "proxy response" (Refer to the sequence diagram of the incoming proxy response in FIG. 7 described above).

The conventional SIP exchange system performs the communication between the SIP telephones to each other by using the SIP call control; however, there is a problem that causes reduction in service, because, in the SIP call control until establishment of communication, the message to notify the final party number stays in the state of the call initiation. That is, even the party of communication in response to the incoming call is changed due to the call forwarding or proxy response, the display of the party number is not changed. Thus, there is unnatural in that the party number is not correspondence with the party of communication.

And, the telephony transmission system disclosed in the "patent document 1" also provides the proxy response; however, it would be predicted that the system becomes unnatural, because the telephone number is not changed to that of the incoming party that has been changed due to the proxy response (the display of the party number is not disclosed in the patent document 1).

The present invention intends to solve the problem. An object of the invention is to provide a SIP exchange system in which the display of the party number is correspondence with the final party of communication, even the party that responds incoming call is changed due to the call forwarding or proxy response.

BRIEF SUMMARY OF THE INVENTION

In order to solve the problem described above, a SIP exchange system according to the present invention comprises a plurality of SIP telephones, SIP exchange equipment, and a network to which the plurality of SIP telephones and the SIP exchange equipment are connected; wherein the SIP exchange equipment includes control part, when the communication of SIP call sequence between the SIP telephones to each other is established, for subsequently performing SIP call replacement sequence, and for performing control to notify the calling and called telephone numbers when call forwarding or proxy response.

In the SIP exchange system according to the present invention, the SIP exchange equipment includes the control part for subsequently performing the SIP call replacement, when the communication of the SIP call sequence between the SIP telephones to each other is established, and for performing control to notify the calling and called telephone numbers when call forwarding or proxy response, so that the SIP exchange equipment, after establishment of the communication between the SIP telephones to each other, can notify the party number corresponding to the party of communication, even the call forwarding or proxy response occurs, by subsequently performing the SIP call replacement sequence.

And, the control part according to the present invention includes sequence part for detecting the response of the call forwarding or proxy response, and for controlling the sequence operation of the SIP call replacement sequence for notification of the telephone number.

The control part according to the present invention includes sequence part for detecting the response of the call forwarding or proxy response, and for controlling the sequence operation of the SIP call replacement sequence for notification of the telephone number, so that the control part, upon establishment of the communication, can perform the sequence operation for notifying the telephone number of the party of communication, and notify a message of the number of the one party to the other party.

Further, the SIP exchange equipment according to the present invention includes storage part for storing sequence program for the SIP call sequence and SIP call replacement sequence.

The SIP exchange equipment according to the present invention includes storage part for storing the sequence program for the SIP call sequence and SIP call replacement sequence, so that the SIP exchange equipment can provide the communicating state based on the call forwarding or proxy response through the SIP call sequence, and notify the party number through the SIP call replacement sequence.

And, a SIP telephone of calling party according to the present invention, during the call forwarding, changes the display of the telephone number from that of the party directed by the dialing to that of the party directed by the call forwarding, base on the notification of the telephone number sent from the SIP exchange equipment.

The SIP telephone of calling party according to the present invention, during the call forwarding, changes the display of the telephone number from that of the party directed by the dialing to that of the party directed by the call forwarding, base on the notification of the telephone number sent from the SIP exchange equipment, so that it is able to recognize the party via the display of the telephone number, even the party that responds the incoming call is different from the party directed by the dialing.

Further, a SIP telephone of calling party according to the present invention, during the proxy response, changes the display of the telephone number from that of the party directed by the dialing to that of the party corresponding to the proxy response, base on the notification of the telephone number sent from the SIP exchange equipment; while a SIP telephone of the proxy response party changes the display of the telephone number from a special telephone number to the number of the calling party, base on the notification of the telephone number sent from the SIP exchange equipment.

The SIP telephone of calling party according to the present invention, during the proxy response, changes the display of the telephone number from that of the party directed by the dialing to that of the party corresponding to the proxy response to the party directed by the dialing, base on the notification of the telephone number sent from the SIP exchange equipment; while the SIP telephone of the proxy response party changes the display of the telephone number from the special telephone number to the number of the calling party, base on the notification of the telephone number sent from the SIP exchange equipment. Consequently, the calling party can recognize the party that responds the incoming call via the display of the telephone number; even the party that responds the incoming call is different from the party directed by the dialing; while the party of proxy response can recognize the calling party, because the display of the telephone number is changed from the special number to that of the calling party.

That is, the present invention has the effects as follow:

In the SIP exchange system according to the present invention, the SIP exchange equipment includes the control part for subsequently performing the SIP call replacement sequence, when the communication of the SIP call sequence between the SIP telephones to each other is established, and for performing control to notify the calling and called telephone numbers when call forwarding or a proxy response, so that the SIP exchange equipment, after establishment of the communication between the SIP telephones to each other, can notify the party number corresponding to the party of communication, even the call forwarding or proxy response occurs, by subsequently performing the SIP call replacement sequence. Therefore, there is an advantage in easy-to-use with the agreement between the party of communication and the display of the party number.

The control part according to the present invention includes sequence part for detecting the response of the call forwarding or proxy response, and for controlling the sequence operation of the SIP call replacement sequence for notification of the telephone number, so that the control part, upon establishment of the communication, can perform the sequence operation for notifying the telephone number of the party of communication, and notify a message of the number of the one party to the other party. Therefore, it is able to display the telephone number of the final communicating party on each SIP telephone.

The SIP exchange equipment according to the present invention includes storage part for storing the sequence programs of the SIP call sequence and SIP call replacement sequence, so that the SIP exchange equipment can provide the communicating state based on the call forwarding or proxy response through the SIP call sequence, and notify the party number through the SIP call replacement sequence. Therefore, it is able to agree between the party of communication and the display of the party number.

The SIP telephone of calling party according to the present invention, during the call forwarding, changes the display of the telephone number from that of the party directed by the dialing to that of the party directed by the call forwarding, base on the notification of the telephone number sent from the SIP exchange equipment, so that it is able to recognize the party via the display of the telephone number, even the party that responds the incoming call is different from the party directed by the dialing. Therefore, it is able to previously avoid an unnecessary judge miss.

The SIP telephone of calling party according to the present invention, during the proxy response, changes the display of the telephone number from that of the party directed by the dialing to that of the party corresponding to the proxy response, base on the notification of the telephone number sent from the SIP exchange equipment; while the SIP telephone of the proxy response party changes the display of the telephone number from the special telephone number to the number of the calling party, base on the notification of the telephone number sent from the SIP exchange equipment. Consequently, the calling party can recognize the party that responds the incoming call via the display of the telephone number; even the party that responds the incoming call is different from the party directed by the dialing; while the called party of proxy response can recognize the calling party, because the display of the telephone number is changed from the special number to the telephone number of the calling party. Therefore, it is able to previously avoid an unnecessary judge miss.

BRIEF DESCRIPTION OF THE DRAWINGS

FIG. 8 is a sequence diagram showing proxy response operation of a conventional SIP exchange system.

DETAILED DESCRIPTION OF THE PREFERRED EMBODIMENTS

Figure 1:
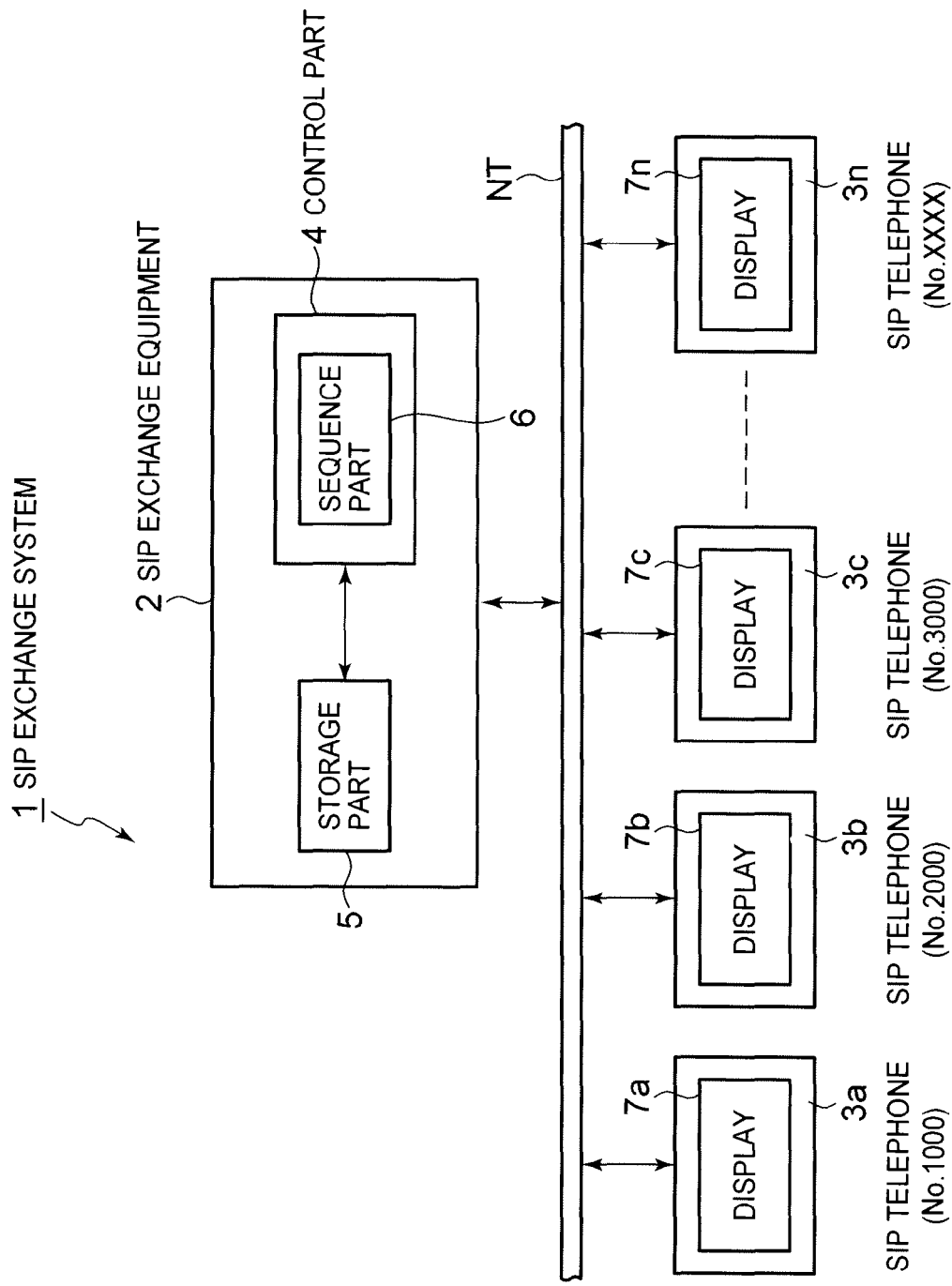
FIG. 1 is a block diagram showing total configuration of a SIP exchange system of an embodiment according to the present invention.

Hereinafter, an embodiment according to the present invention will be described in conjunction with the accompanying drawings. FIG. 1 is a block diagram showing total configuration of a SIP exchange system of an embodiment according to the present invention. In FIG. 1, a SIP exchange system 1 comprises a SIP exchange equipment 2 which globally operates the system with SIP (Session Initiation Protocol) call control and SIP call replace control, SIP telephones 3*a* to 3*n*, and a network NT such as Internet or Wide LAN to which the SIP exchange equipment 2 and the SIP telephones 3*a* to 3*n* are connected. In addition, the telephone number of the SIP telephone 3*a* is "No. 1000", telephone number of the SIP telephone 3*b* is "No. 2000", and telephone number of the SIP telephone 3*c* is "No. 3000".

The SIP exchange equipment 2 having control part 4 and storage part 5 performs communication control among the SIP telephones 3*a* to 3*n*, through the SIP call control, and performs control to mutually display the telephone numbers of the SIP telephones 3*a* to 3*n* that are finally communicating with, through the SIP call replacement control.

When mutually establishing the communication of the SIP call sequence among the SIP telephones 3*a* to 3*n*, the control part 4 subsequently performs the SIP call replacement sequence, and performs control to notify the telephone number of the calling and called party during the call forwarding or proxy response.

And, when a SIP telephone (e.g., SIP telephone 3*b* "No. 2000") previously sets a destination to forward (SIP telephone 3*c* "No. 3000") for "call forwarding", the control part 4, upon incoming call to the "number 2000", controls to immediately forward the incoming call to the party of the call forwarding (SIP telephone 3*c* "No. 3000").

Further, when the control part 4 receives a calling (instruction for ringing) to an arbitrary SIP telephone (e.g., SIP telephone 3*b* in which call forwarding is not set) and recognizes a special number "No.YZ" for proxy response from other SIP telephone (e.g., SIP telephone 3c), controls to stop the calling to the SIP telephone 3b, and initiate calling (instruction for ringing) to the SIP telephone 3c.

And, the control part 4 includes sequence part 6 which, upon detecting response of a SIP telephone (e.g., SIP telephone 3c "No. 3000") with call forwarding or proxy response and communication between the SIP telephone (SIP telephone 3c "No. 3000") and a SIP telephone (e.g., SIP telephone 3a "No. 1000") that has initiated dialing, immediately performs the call replacement sequence, notifies the party number of communication "No. 3000" to the SIP telephone 3a and the party number of communication "No. 1000" to the SIP telephone 3c respectively, and controls to display "party number 3000" on the display of the SIP telephone 3a and "party number 1000" on the display of the SIP telephone 3c.

In this way, the control part 4 according to the present invention includes the sequence part 6 for detecting the response through the call forwarding or proxy response, and for controlling the sequence operation of the SIP call replacement sequence for the telephone number notification, so that, the control part 4, upon establishment of the communication, performs the sequence operation to notify each telephone number of the parties communicating with, and can notify the messages of parties communicating with (e.g., "party number: 3000" and "party number: 1000") to the SIP telephones (e.g., SIP telephones 3a and 3c). Therefore, the control part 4 can display the telephone numbers of the final communicating parties on each SIP telephones.

The storage part 5 which comprises a memory such as flash memory or EEPROM, stores sequence programs of the SIP call sequence and SIP call replacement sequence, and transmits each program to the control part 4 based on the instruction thereof.

Also, the storage part 5 stores the telephone numbers "No. 1000" to "No. xxxx" corresponding to the SIP telephones 3a to 3n, and stores a telephone number at each event such as dial initiation, incoming call, setting of call forwarding, or proxy response, based on an instruction from the control part 4.

In this way, the SIP exchange equipment 2 includes the storage part 5 for storing the sequence programs of the SIP call sequence and SIP call replacement sequence, so that the SIP exchange equipment 2 can provide the communicating state of the call forwarding or proxy response through the SIP call sequence, and notify the number of the party of communication through the SIP call replacement sequence. Therefore, it is able to provide agreement between the party of communication and the display of the telephone number.

The SIP telephones 3a to 3n are given the telephone numbers "1000" to "xxxx" respectively, and have the displays 7a to 7n each of which displays the communication between the telephones and the telephone number of the party in communication (party number in communication) through the control of the SIP call sequence and SIP call replacement sequence of the control part 4.

The SIP telephone of calling party (e.g., SIP telephone 3a), during the call forwarding, changes the display of the telephone number from that (e.g., "2000") of the destination directed by the dialing (SIP telephone 3b) to that (e.g., "3000") of the destination directed by the call forwarding (SIP telephone 3c), base on the notification of the telephone number sent from the SIP exchange equipment 2, so that it is able to recognize the party of communication via the display of the telephone number, even the party that responds the incoming call is different from the party directed by the dialing.

Also, the SIP telephone of calling party (e.g., SIP telephone 3a), during the proxy response, changes the display of the telephone number from that (e.g., "2000") of the party directed by the dialing (SIP telephone 3b) to that (e.g., "3000") of the party corresponding to the proxy response (SIP telephone 3c), base on the notification of the telephone number sent from the SIP exchange equipment 2; while the SIP telephone of the proxy response party (e.g., SIP telephone 3c) changes the display of the telephone number from the special telephone number (e.g., "YZ") to the number (e.g., "1000") of the calling party (SIP telephone 3a), base on the notification of the telephone number sent from the SIP exchange equipment 2, so that the calling party can recognize the party (SIP telephone 3c) via the display of the telephone number ("3000"), even the party that responds the incoming call is different from the party directed by the dialing; while the called party of proxy response can recognize the party, because the display of the telephone number is changed from the special number to the telephone number ("1000") of the calling party.

Therefore, the SIP telephone 3a displays the telephone number "3000" of the SIP telephone 3c that is the party of communication, even the party that responds the incoming call is changed from the SIP telephone 3b to the SIP telephone 3c due to the call forwarding or proxy response, so that it is able to recognize the party of communication, and to previously avoid an unnecessary judge miss.

Next, a sequence operation in which, when the SIP terminal 3a dials to the SIP terminal 3b, the destination directed by the dialing is the SIP terminal 3c due to the SIP terminal 3b being set to "call forwarding"; or the SIP terminal 3c of "proxy response" receives the incoming call to the SIP terminal 3b, will be described.

Figure 2:
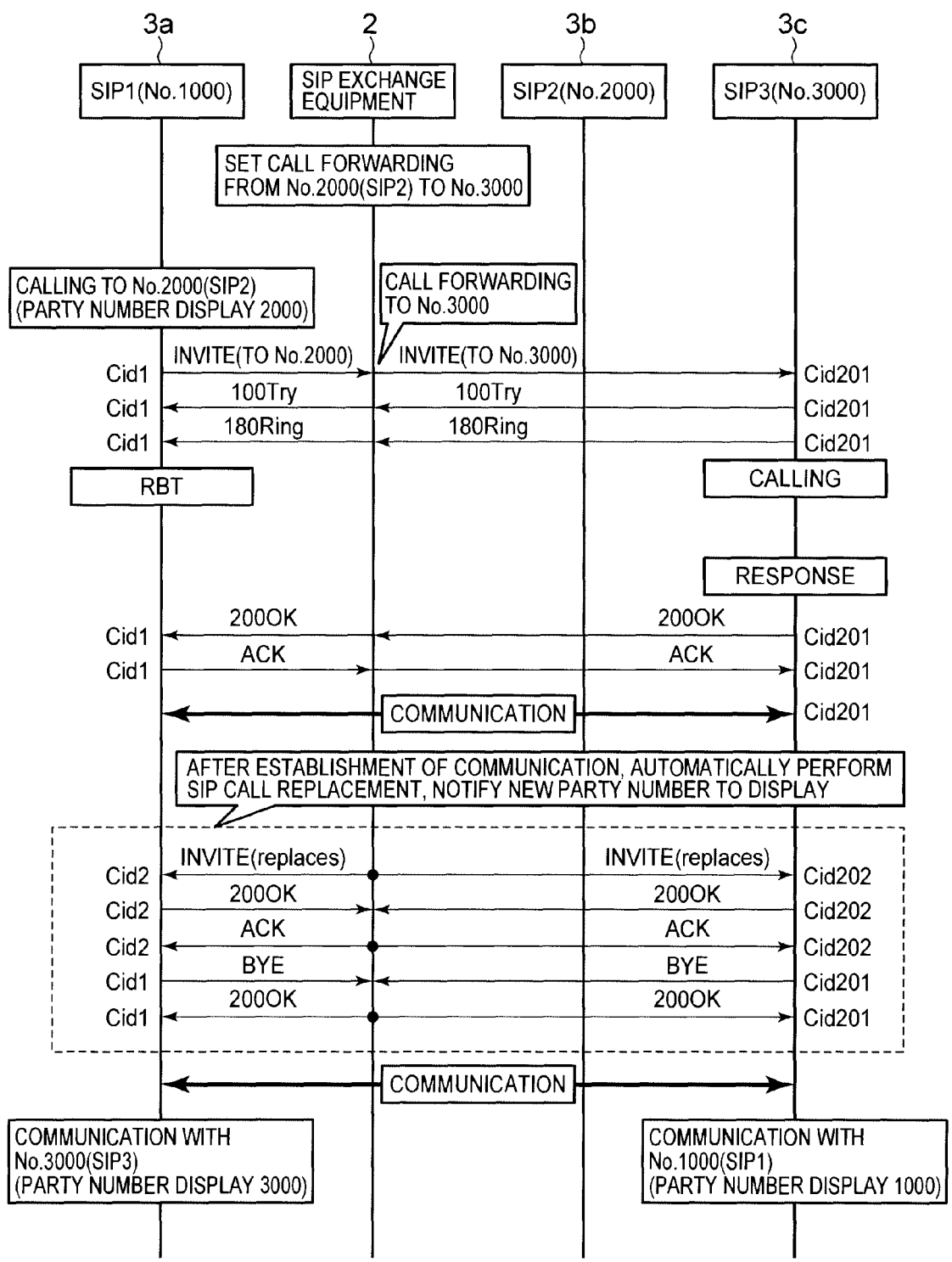
FIG. 2 is a sequence diagram showing call forwarding operation of a SIP exchange system of an embodiment according to the present invention.

FIG. 2 is a sequence diagram showing call forwarding operation of a SIP exchange system of an embodiment according to the present invention. In addition, the SIP telephone 3a, SIP telephone 3b, and SIP telephone 3c are represented as a SIP 1, a SIP 2, and SIP 3 respectively.

In FIG. 2, the SIP exchange equipment 2 has previously been set to the "call forwarding" of forwarding a call from the SIP 2 (No. 2000) to the SIP 3 (No. 3000).

When the SIP 1 (No. 1000) dials to the SIP 2 (No. 2000), the display 7a of the SIP 1 (No. 1000) displays the "party number 2000", and when the SIP 1 (No. 1000) transmits a calling message "INVITE (to No. 2000)" to the SIP 2 (No. 2000), the SIP 2 (No. 2000) transmits a calling message "INVITE (to No. 3000)" to the SIP 3 (No. 3000) because of forwarding the call to the "party number 3000".

When the SIP 3 (No. 3000) receives the calling message "INVITE (to No. 3000)", transmits a temporary reception response message "100Try" to the SIP exchange equipment 2. The SIP exchange equipment 2 then transmits the temporary reception response message "100 Try" to the SIP 1 (No. 1000).

Subsequently, when the SIP 3 (No. 3000) transmits an incoming ring start message "180 Ring" to the SIP 1 (No. 1000) via the SIP exchange equipment 2, a ringing tone (incoming tone) is generated in the SIP 3 (No. 3000), and a RBT (ring back tone) is generated in the SIP 1 (No. 1000).

When the SIP 3 (No. 3000) responds the incoming call by listening the ringing tone (incoming tone), transmits an incoming response message "200 OK" to the SIP 1 (No. 1000) via the SIP exchange equipment 2.

When the SIP 1 (No. 1000) receives the incoming response message "200 OK", transmits an acknowledgement response message "ACK" to the SIP 3 (No. 3000) via the SIP exchange equipment 2.

In this state, the communication between the SIP 1 (No. 1000) and SIP 3 (No. 3000) is established; and the display 7a of the SIP 1 (No. 1000) displays "party number 2000" and the display 7*c* of the SIP 3 (No. 3000) displays "party number 1000".

When the communication between the SIP 1 (No. 1000) and SIP 3 (No. 3000) is established, the SIP exchange equipment 2 initiates the SIP replacement sequence, and transmits a message "INVITE (replaces)" to both of the SIP 1 (No. 1000) and SIP 3 (No. 3000).

When the SIP 1 (No. 1000) and SIP 3 (No. 3000) receive the message "INVITE (replace)", transmit response messages "200 OK" to the SIP exchange equipment 2 respectively.

Next, when the SIP exchange equipment 2 transmits an acknowledgement response "ACK" to the SIP 1 (No. 1000) and SIP 3 (No. 3000), the SIP 1 (No. 1000) and SIP 3 (No. 3000) transmit finish messages "BYE" to the SIP exchange equipment 2 respectively.

When the SIP exchange equipment 2 receives the finish messages "BYE", transmits a response message "200 OK" to the SIP 1 (No. 1000) and SIP 3 (No. 3000), and finishes the SIP replacement sequence.

During the SIP replacement sequence, the SIP exchange equipment 2 notifies number information "3000" to the SIP 1 (No. 1000) and number information "1000" to the SIP 3 (No. 3000).

When the SIP 1 (No. 1000) receives the number information "3000", changes the "party number 2000" displayed on the display 7*a* represented in FIG. 1 to the "party number 3000".

On the other hand, when the SIP 3 (No. 3000) receives the number information "1000", displays the "party number 1000" on the display 7*c* represented in FIG. 1. However, display 7*c* has already displayed the "party number 1000" before the SIP replacement sequence.

Because of performing exchange of the party number information with the SIP replacement sequence describe above, the SIP 1 (No. 1000) and SIP 3 (No. 3000) can perform the communication each other; and the display of the SIP 1 (No. 1000) displays "party number 3000" and the display of the SIP 3 (No. 3000) displays "party number 1000". Therefore, it is able to agree the party of communication and the party number display thereof.

Figure 3:
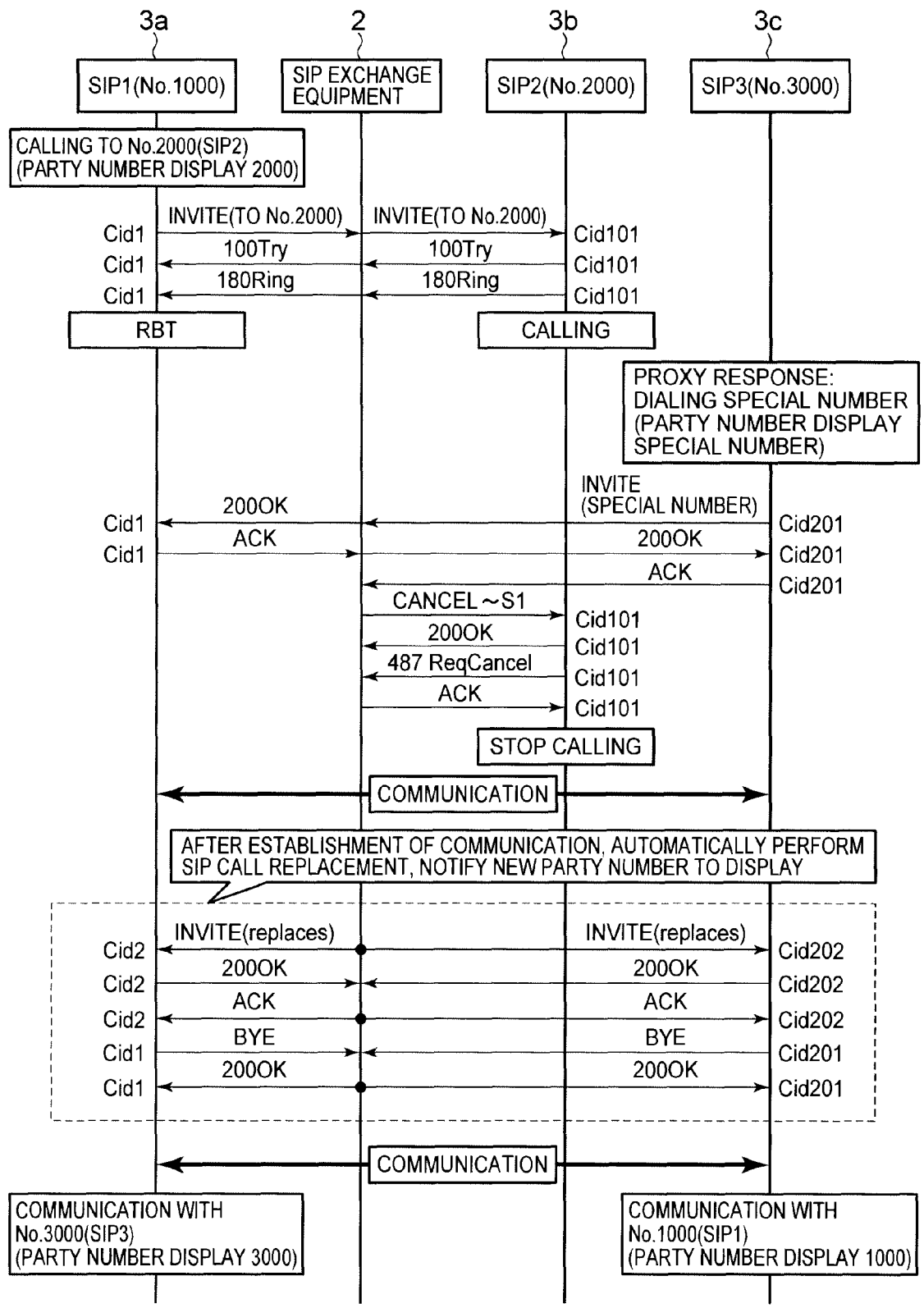
FIG. 3 is a sequence diagram showing proxy response operation of a SIP exchange system of an embodiment according to the present invention.

FIG. 3 is a sequence diagram showing proxy response operation of a SIP exchange system of an embodiment according to the present invention. In addition, the SIP telephone 3*a*, SIP telephone 3*b*, and SIP telephone 3*c* are represented as a SIP 1, a SIP 2, and SIP 3 respectively.

In FIG. 3, when the SIP 1 (No. 1000) dials to the SIP 2 (No. 2000), the display 7*a* of the SIP 1 (No. 1000) displays the "called party number 2000", then the ringing tone (incoming tone) is generated in the SIP 2 (No. 2000), and the RBT (ring back tone) is generated in the SIP 1 (No. 1000). In this state, when the SIP 3 (No. 3000) dials a special number "YZ" for the proxy response, and transmits a calling message "INVITE (to the special number)" to the SIP 2 (No. 2000), the SIP 2 (No. 2000) transmits an incoming response message "200 OK" to the SIP 1 (No. 1000).

When the SIP 1 (No. 1000) transmits an acknowledgement message "ACK" to the SIP exchange equipment 2, the SIP exchange equipment 2 transmits a response message "200 OK" to the SIP 3 (No. 3000).

Subsequently, when the SIP 3 (No. 3000) transmits an acknowledgement response "ACK" to the SIP exchange equipment 2, the SIP 1 (No. 1000) and SIP 3 (No. 3000) initiate the communication.

On the other hand, when the SIP exchange equipment 2 transmits an incoming cancel message "CANCEL" to the SIP 2 (No. 2000), and transmits an acknowledgement response message "ACK" after receiving a response message "200 OK" and a message "487 ReqCancel" from the SIP 2 (No. 2000), the SIP 2 (No. 2000) stops the calling (incoming tone stop).

In this state, the SIP 1 (No. 1000) and SIP 3 (No. 3000) are in the communication; and the display 7*a* of the SIP 1 (No. 1000) displays the "party number 3000" and the display 7*c* of the SIP 3 (No. 3000) displays the "special number (YZ)".

When the communication between the SIP 1 (No. 1000) and SIP 3 (No. 3000) is established, the SIP exchange equipment 2 initiates the SIP replacement sequence, and transmits a message "INVITE (replaces)" to both of the SIP 1 (No. 1000) and SIP 3 (No. 3000).

When the SIP 1 (No. 1000) and SIP 3 (No. 3000) receive the message "INVITE (replaces)", transmit response messages "200 OK" to the SIP exchange equipment 2.

Next, when the SIP exchange equipment 2 transmits an acknowledgement response "ACK" to the SIP 1 (No. 1000) and SIP 3 (No. 3000), the SIP 1 (No. 1000) and SIP 3 (No. 3000) finish messages "BYE" to the SIP exchange equipment 2.

When the SIP exchange equipment 2 receives the finish messages "BYE", transmits response messages "200 OK" to the SIP 1 (No. 1000) and SIP 3 (No. 3000), and finishes the SIP replacement sequence.

During the SIP replacement sequence, the SIP exchange equipment 2 notifies number information "3000" to the SIP 1 (No. 1000) and number information "1000" to the SIP 3 (No. 3000).

When the SIP 1 (No. 1000) receives the number information "3000", changes the "party number 2000" displayed on the display 7*a* represented in FIG. 1 to the "party number 3000".

On the other hand, when the SIP 3 (No. 3000) receives the number information "1000", changes the "party number YZ" displayed on the display 7*c* represented in FIG. 1 to the "party number 1000".

Because of performing exchange of the party number information with the SIP replacement sequence describe above, the SIP 1 (No. 1000) and SIP 3 (No. 3000) can perform the communication each other; and the display of the SIP 1 (No. 1000) displays "party number 3000" and the display of the SIP 3 (No. 3000) displays "party number 1000". Therefore, it is able to agree the party of communication and the party number display thereof.

Figure 4:
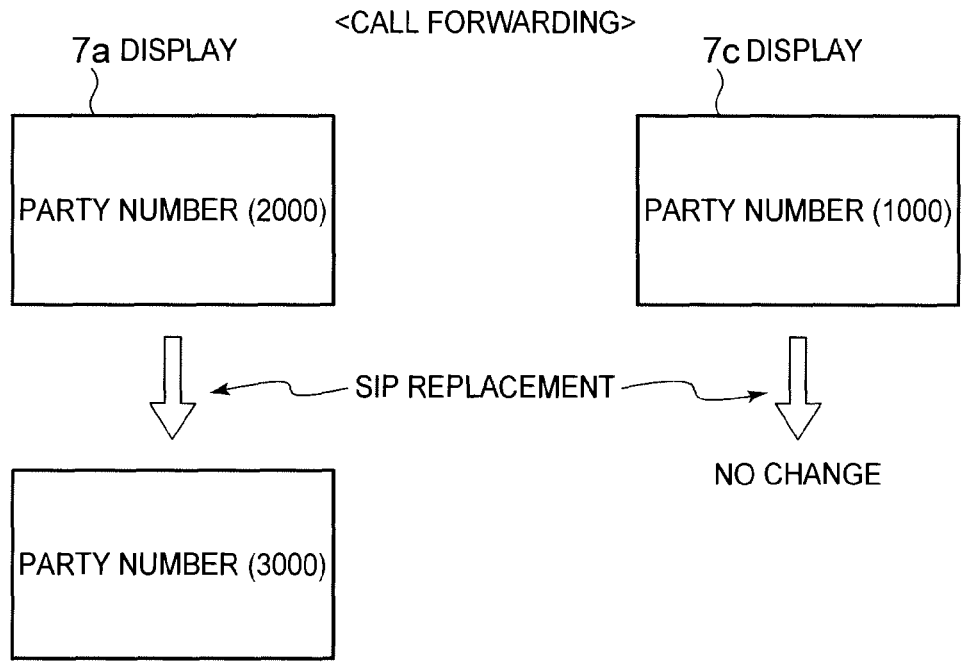
FIG. 4 is a transition diagram of the party number display during call forwarding of an embodiment according to the present invention.

FIG. 4 is a transition diagram of the party number display during call forwarding of an embodiment according to the present invention. In addition, the SIP telephone 3*b* (No. 2000) has previously been set to the call forwarding in which calls that the SIP telephone 3*a* (No. 1000) dials forward to the SIP telephone 3*c* (No. 3000). It is shown that the party number display on the display 7*a* of the SIP 1 (No. 1000) and on the display 7*c* of the SIP 3 (No. 3000).

In FIG. 4, when the SIP call sequence, the display 7*a* displays the "party number 2000" and the display 7*c* displays the "party number 1000".

When moving to the SIP call replacement sequence, the display 7*a* changes the display from the "party number 2000" to the "party number 3000"; while the display 7*c* still displays the "party number 1000"; i.e., no change.

Figure 5:
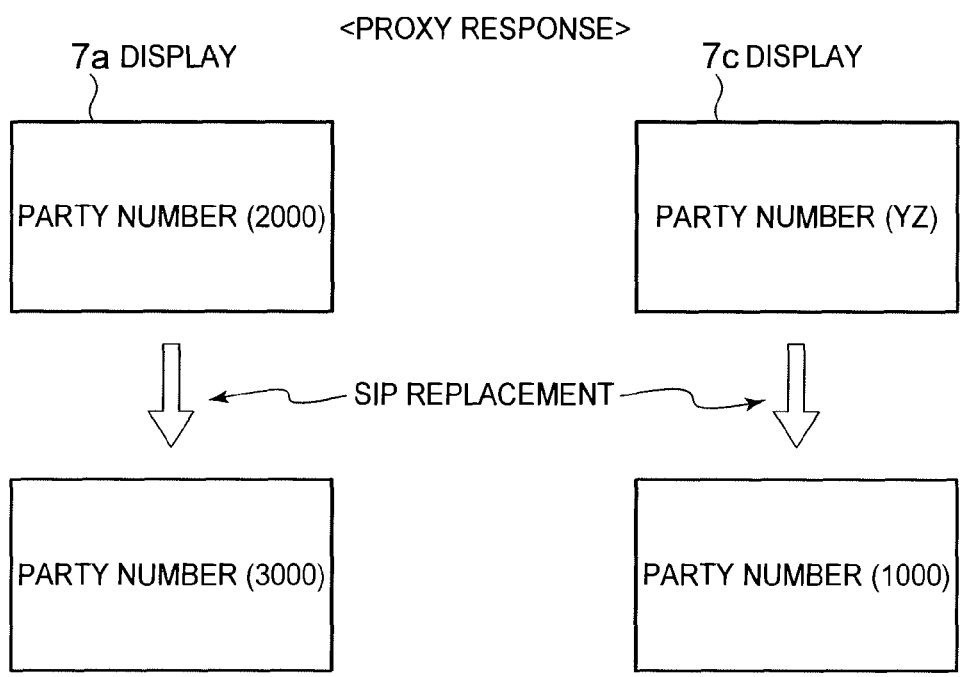
FIG. 5 is a transition diagram of the party number display during proxy response of an embodiment according to the present invention.
Figure 6:
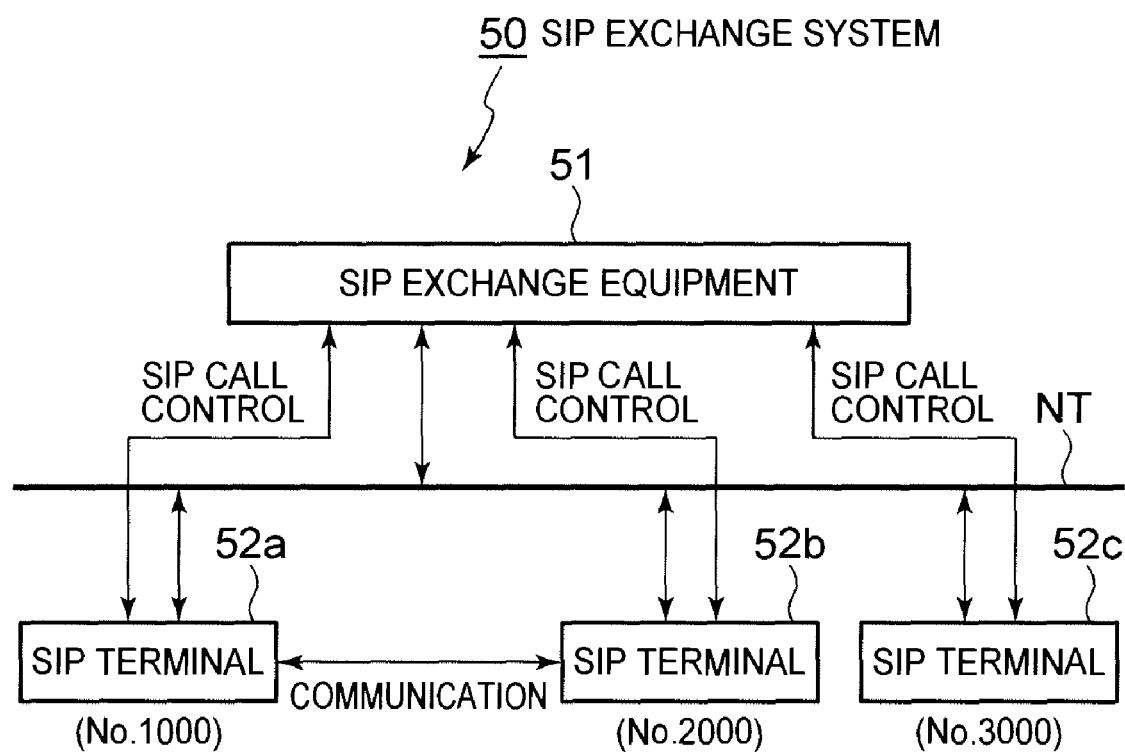
FIG. 6 is a configuration of a conventional SIP exchange system.
Figure 7:
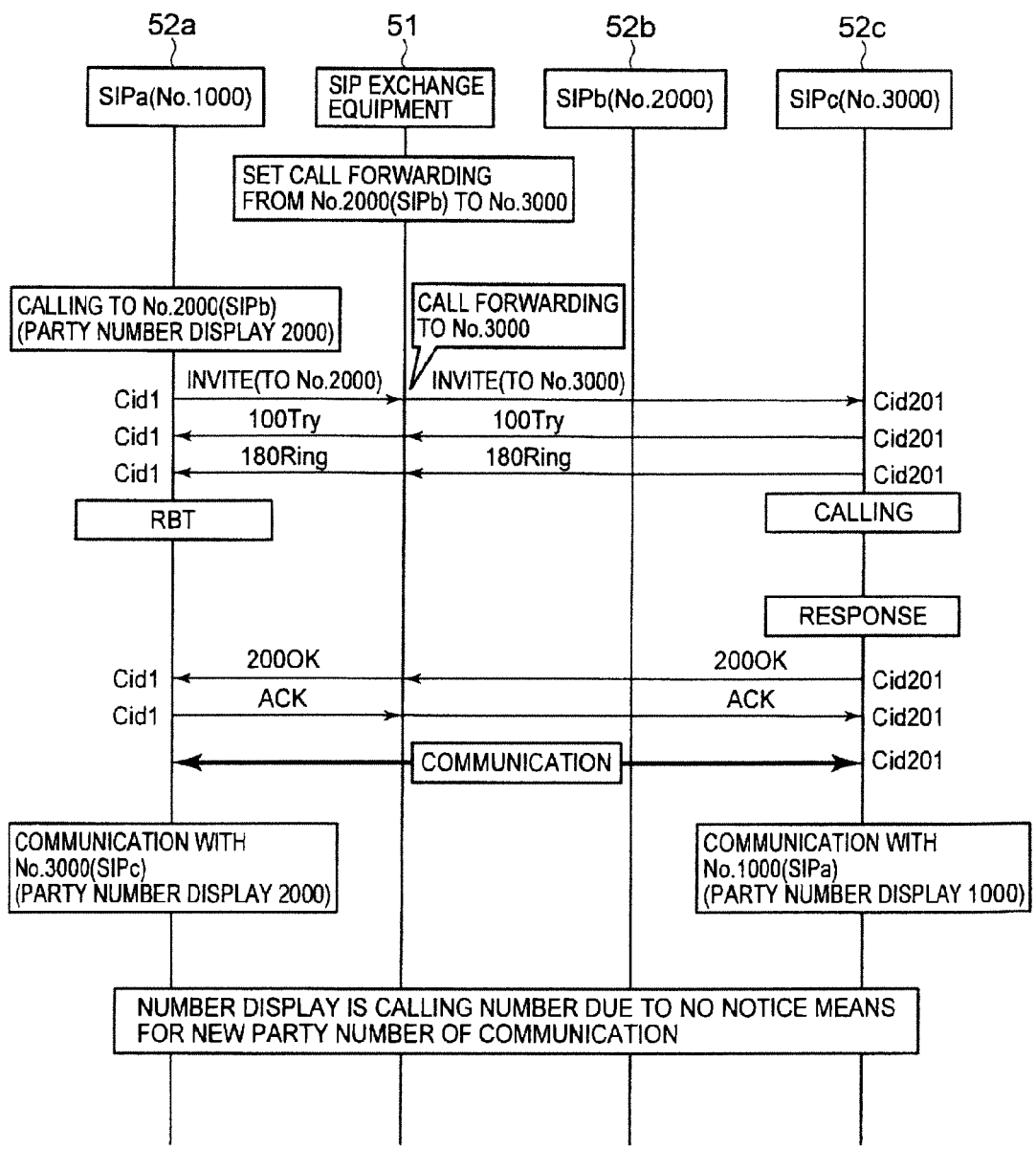
FIG. 7 is a sequence diagram showing call forwarding operation of a conventional SIP exchange system.

FIG. 5 is a transition diagram of the party number display during proxy response of an embodiment according to the present invention. In addition, when the SIP telephone 3*a* (No. 1000) dials to the SIP telephone 3*b* (No. 2000), the SIP telephone 3*b* (No. 2000) receives the incoming call (ringing). It is shown that the party number display on the display 7*a* of the SIP telephone 3a and on the display 7c of the SIP telephone 3c, when the SIP telephone 3c performs the proxy response with operating a special number.

In FIG. 4, the display 7a displays the "party number 2000" and the display 7c displays the "special number YZ" when the SIP call sequence.

When moving to the SIP call replacement sequence, the display 7a changes the display form the "party number 2000" to the "party number 3000"; the display 7c changes the display from the "special number YZ" to the "party number 1000".

As described above, in the SIP exchange system 1 according to the present invention, the SIP exchange equipment 2 includes the control part for subsequently performing the SIP call replacement sequence, when the communication between the SIP telephones (the SIP telephone 3a and SIP telephone 3c) is established through the SIP call sequence, and for performing the control to notify the telephone numbers of the calling party (SIP telephone 3a) and the response party (SIP telephone 3c) of the call forwarding or proxy response, so that by subsequently performing the SIP call replacement sequence after establishment of the communication between the SIP telephones each other, it is able to notify the party number corresponding to the party of communication, even the call forwarding or proxy response occurs. Therefore, there is an advantage in easy-to-use with the agreement between the communicating party and the display of the party number.

Because the SIP exchange system according to the present invention provides the agreement between the final party in communication and the display of the party number, it can apply to any SIP exchange system utilizing the SIP call control.

In addition, while the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A Session Initiation Protocol (SIP) exchange system comprising:
 a plurality of SIP telephones;
 SIP exchange equipment; and
 a network to which the plurality of SIP telephones and the SIP exchange equipment are connected,
 wherein the SIP exchange equipment includes a control part configured to:
  initiate a SIP call replacement sequence when i) a response is detected from a response party's SIP telephone receiving a forwarded call or a proxy response is detected from a response party's SIP telephone and ii) communication of a SIP call sequence between the response party's SIP telephone and a calling party's SIP telephone is established; and
  thereafter notify the calling party's SIP telephone of the response party's telephone number and notify the response party's SIP telephone of the calling party's telephone number during the SIP call replacement sequence,
 wherein the SIP call replacement sequence includes:
  transmitting an invite message from the SIP exchange equipment to each of the calling party's SIP telephone and the response party's SIP telephone;
  transmitting a first response message from each of the calling party's SIP telephone and the response party's SIP telephone to the SIP exchange equipment when each of the calling party's SIP telephone and the response party's SIP telephone receives the invite message;
  transmitting an acknowledgement response message from the SIP exchange equipment to each of the calling party's SIP telephone and the response party's SIP telephone when the SIP exchange equipment receives the first response message.

2. The SIP exchange system according to claim 1, wherein the control part further includes a sequence part configured to:
 detect the response or the proxy response; and
 control the sequence operation of the SIP call replacement for the telephone number notification.

3. The SIP exchange system according to claim 1, wherein the SIP exchange equipment further includes a storage part configured to store sequence programs of the SIP call sequence and SIP call replacement sequence.

4. The SIP exchange system according to claim 1, wherein
 a response is detected from a response party's SIP telephone receiving a forwarded call, and
 the calling party's SIP telephone changes display, based on the telephone number notification provided from the SIP exchange equipment, from the telephone number of the destination directed by dialing to the response party's telephone number.

5. The SIP exchange system according to claim 1, wherein
 a proxy response is detected from a response party's SIP telephone,
 the calling party's SIP telephone changes display, based on the telephone number notification provided from the SIP exchange equipment, from the telephone number of the destination directed by dialing to the response party's telephone number, and
 the response party's SIP telephone changes display, based on the telephone number notification provided from the SIP exchange equipment, from a special number to the calling party's telephone number.

6. The SIP exchange system according to claim 1, wherein the SIP call replacement sequence further includes:
 transmitting a finish message from each of the calling party's SIP telephone and the response party's SIP telephone to the SIP exchange equipment when each of the calling party's SIP telephone and the response party's SIP telephone receives the acknowledgement response message; and
 transmitting a second response message from the SIP exchange equipment to each of the calling party's SIP telephone and the response party's SIP telephone when the SIP exchange equipment receives the finish message to finish the SIP call replacement sequence.

7. A method for controlling Session Initiation Protocol (SIP) exchange equipment connected to a plurality of SIP telephones via a network, the method comprising:
 detecting a response from a response party's SIP telephone receiving a forwarded call or a proxy response from a response party's SIP telephone;
 establishing communication of a SIP call sequence between the response party's SIP telephone and a calling party's SIP telephone;

initiating a SIP call replacement sequence when the response or the proxy response is detected and the communication of the SIP call sequence between the response party's SIP telephone and the calling party's SIP telephone is established; and thereafter notifying the calling party's SIP telephone of the response party's telephone number and notifying the response party's SIP telephone of the calling party's telephone number during the SIP call replacement sequence, wherein the SIP call replacement sequence includes:

transmitting an invite message from the SIP exchange equipment to each of the calling party's SIP telephone and the response party's SIP telephone;

transmitting a first response message from each of the calling party's SIP telephone and the response party's SIP telephone to the SIP exchange equipment when each of the calling party's SIP telephone and the response party's SIP telephone receives the invite message;

transmitting an acknowledgement response message from the SIP exchange equipment to each of the calling party's SIP telephone and the response party's SIP telephone when the SIP exchange equipment receives the first response message.

8. The method according to claim 7, wherein the SIP call replacement sequence further includes:

transmitting a finish message from each of the calling party's SIP telephone and the response party's SIP telephone to the SIP exchange equipment when each of the calling party's SIP telephone and the response party's SIP telephone receives the acknowledgement response message; and transmitting a second response message from the SIP exchange equipment to each of the calling party's SIP telephone and the response party's SIP telephone when the SIP exchange equipment receives the finish message to finish the SIP call replacement sequence.

* * * * *